J. MILLER.
Grain Winnower.
No. 35,462.
Patented June 3, 1862.
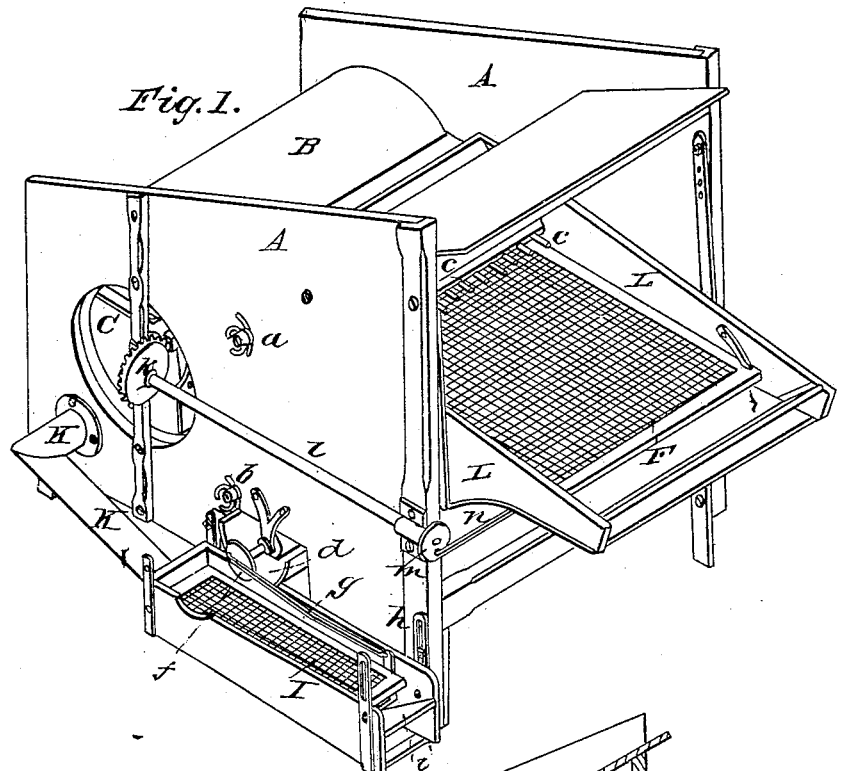
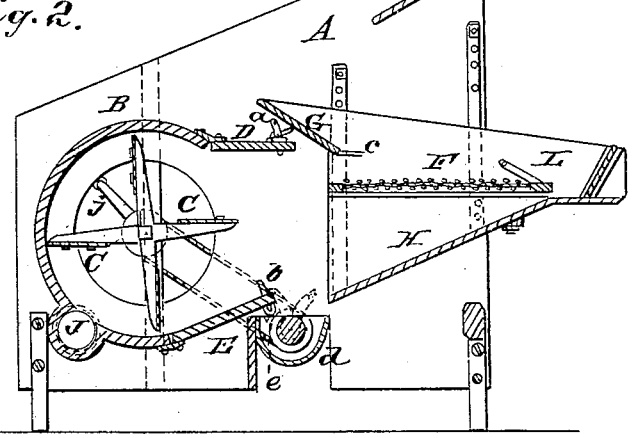

UNITED STATES PATENT OFFICE.

JACOB MILLER, OF CANTON, OHIO.

IMPROVEMENT IN FANNING-MILLS.

Specification forming part of Letters Patent No. 35,462, dated June 3, 1862.

*To all whom it may concern:*

Be it known that I, JACOB MILLER, of Canton, in the county of Stark and State of Ohio, have invented certain new and useful Improvements in Fanning-Mills; and I do hereby declare the following to be a full, clear, and exact description of the construction and operation of the same, reference being had to the accompanying drawings, making a part of this specification, in which—

Figure 1 represents a perspective view of the fanning-mill, and Fig. 2 represents a longitudinal vertical section through the same.

Similar letters of reference where they occur denote like parts of the machine in both of the drawings.

The nature of my invention consists, first, in the use of an auxiliary riddle or riddle and shoe on the side of the fanning-mill for giving the grain a second cleaning; and my invention further consists in combining with the auxiliary riddle or riddle and shoe a conducting-pipe as an air-passage from the fan-blower to said riddle or riddle and shoe; and it further consists in combining with the main riddle and shoe and the auxiliary riddle or riddle and shoe a conductor for transferring the grain from the former to the latter to subject it to a second cleaning.

To enable others skilled in the art to make and use my invention, I will proceed to describe the same with reference to the drawings.

A A represents the sides of the fanning-mill, and B the fan-case, which incloses the fan-wheel C. Connected with the fan-case there are hinged wind-boards D E, which can be adjusted by the slots and set-screws $a$ $b$, so as to contract or expand the blast which passes to the main riddle F, or for changing the direction of the blast with regard to the riddle F.

The grain from the hopper falls upon the directing-board G, and thence onto the riddle F, the straws and coarser material being carried forward onto the riddle by the fingers $c$. The grain, after it has passed through the riddle F, drops upon the directing-board H, and is by it delivered into a trough or conveyer, $d$, in which a revolving armed shaft, $e$, turns for carrying the grain onto the auxiliary riddle I, placed at the side of the machine. This riddle I may have a shake motion given to it by means of the crank-wheel $f$ and pitman $g$, and the grain passing over the riddle I is subjected to a blast brought from the chamber J, which communicates with the fan-chamber by means of a pipe or trunk, K. The frame or box or shoe in which the auxiliary riddle is placed may be adjusted at $h$ to give it more or less inclination to cause the grain to pass over it with greater or less rapidity, and when the grain arrives at the end of the riddle I it drops upon the directing-board $i$, which carries it to the desired delivery.

The fan is driven by a crank, $j$, and a pinion on the fan-shaft turns the bevel-gear $k$ on the shaft $l$, and the crank-wheel $m$ on the shaft $l$ through the spring-pitman $n$ vibrates the main shoe L with its main riddle F, directing-board, &c.

The fanning-mill, auxiliary riddle, and air-conveyer may be so arranged that they can be transposed from one side to the other side of the fanning-mill, so as to be operated from either side, and instead of taking the blast from the main fan-blower to the auxiliary riddle a separate fan may be used for this purpose.

This machine may be built and used in connection with thrashing-machines, so as to thrash and clean the grain in one continuous operation, or for cleaning and separating thrashed grain, it being applicable to both operations, whether joint or separate.

Having thus fully described the nature and object of my invention, what I claim therein as new is—

1. In combination with the main riddle and shoe, an auxiliary riddle on the side of the fanning-mill to give the grain a second cleaning, substantially as described.

2. In combination with the auxiliary riddle, a conducting-pipe or air-passage for introducing a blast to said riddle, substantially as described.

3. In combination with the main riddle and shoe and the auxiliary riddle, a conveying apparatus for bringing the grain from underneath the main riddle to the auxiliary riddle, substantially as herein described.

4. The so constructing of the fanning-mill and the auxiliary riddle as that the latter may be used on either side of the machine preferred, substantially as described.

JACOB MILLER.

Witnesses:
JOHN LAHM,
L. MILLER.